(No Model.)
P. WHYTE.
APPARATUS FOR APPLYING HOSE TO COUPLINGS.
No. 526,597. Patented Sept. 25, 1894.
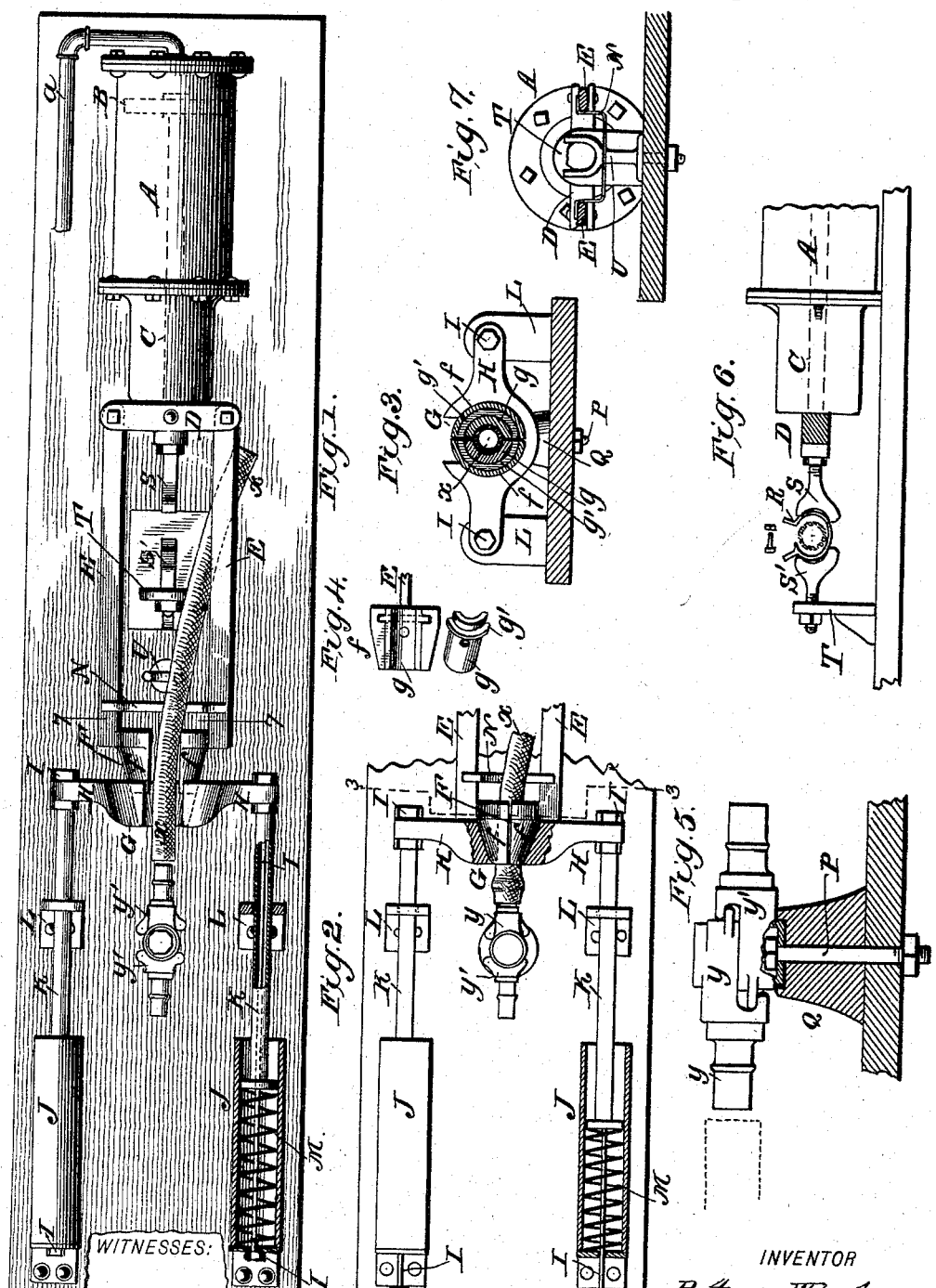

UNITED STATES PATENT OFFICE.

PETER WHYTE, OF MERIDIAN, MISSISSIPPI.

APPARATUS FOR APPLYING HOSE TO COUPLINGS.

SPECIFICATION forming part of Letters Patent No. 526,597, dated September 25, 1894.

Application filed May 22, 1894. Serial No. 512,073. (No model.)

*To all whom it may concern:*

Be it known that I, PETER WHYTE, of Meridian, in the county of Lauderdale and State of Mississippi, have invented a new and Improved Apparatus for Applying and Securing Hose to Couplings, of which the following is a specification.

Considerable force is required to apply the ends of the flexible hose sections, ordinarily used for connecting the air-brake pipes of railway cars, to the nipples or other detachable couplings of such sections, and I have devised a simple and efficient apparatus for this purpose, and also for applying the screw clamps which fasten the hose sections to such nipples after having been forced on the same.

The points of features of the invention will be hereinafter set forth, and described in detail with reference to the accompanying drawings, in which—

Figure 1 is mainly a plan view of my apparatus—a small portion being in section. Fig. 2 is a similar view of a part of the apparatus illustrating the operation. Fig. 3 is a vertical transverse section, on line 3—3 of Fig. 1. Fig. 4 is a detail view, illustrating the bushing for the clamping jaws. Fig. 5 is an enlarged side and sectional view of a portion of the apparatus. Fig. 6 is a side sectional view of the portion of the apparatus by which clamps are applied for fastening hose on nipples. Fig. 7 is a vertical transverse section on line 7—7 of Fig. 1.

The fixed parts of the apparatus are bolted on a suitable horizontal base.

A indicates a cylinder containing a slidable piston, B, to whose rod, C, is attached a cross head, D. Air or steam is admitted to and exhausted from said cylinder by a pipe $a$, having a suitable valve attachment (not shown) for controlling inlet and exhaust of the motor fluid. To said cross-head, D, are pivoted two bars or arms, E, whose free ends carry the hose clamp proper, F. The latter consists of two tapered semi-circular parts, or conical segments, $f$, which, when brought together, form a hollow cone, that is to say a cone having an axial bore or opening which is of slightly less diameter than the hose to be clamped thereon. The other part of the clamping media is a conical socket, G, adapted to receive the coniform clamp, F, the same being formed in a cross head, H, fixed on the ends of two parallel rods, I, which extend through parallel horizontal cylinders, J, and have heads on each end, as shown. Tubes, K, inclose the rods, I, for about two thirds of their length, and slide in guides, L, fixed on the base or platform. The ends of the tubes, K, which are within the cylinders, J, are enlarged and press against spiral springs, M, and thus hold the socket cross-head, H, normally in the position shown in full lines in Fig. 1. The said socket, G, is cut out or open on the upper side, to enable the hose, $x$, to be conveniently inserted and removed. It will be seen that the jaws of the clamp, F, are held normally apart by means of a spring, N, arranged adjacently between the bars, E.

The nipple or clutch coupling $y$, to which the end of the hose, $x$, is to be applied, is temporarily supported or held by any suitable means, but I prefer to employ for this purpose the other half, $y'$, of such form of clutch coupling. The part, $y'$, is secured by a screw-bolt, P, (see Fig. 5,) upon a pedestal or base, Q, having a central bore to receive said bolt and a socket in its upper end to accommodate the coupling, $y'$.

The apparatus thus far described operates as follows: The movable parts being in the normal position shown in Fig. 1, and a hose section, $x$, being laid between the clamping jaws $f$, $f$, and in the socket, G, with its end abutting against the nipple to which it is to be applied, air or steam is admitted to the cylinder, A, behind the piston thus carrying the conical clamp, F, forward into the socket, G, whereby the latter is forced forward against the tension of the springs, M, and the jaws of said clamp are at the same time compressed upon the hose, $x$, so that it is carried along with the clamping media and thereby forced upon the unyielding nipple or coupling $y$. It will be seen that, as the springs yield, the rods, I, slide through the rear ends of the cylinders, J. Air or steam being then exhausted from the cylinder, A, the clamp, F, opens, and the hose, $x$, with the attached coupling, $y$, may be readily removed. The hose, $x$, now requires to be fastened on the nipple or coupling, $y$, which is effected by a familiar form of screw-clamp, R, Fig. 6. Such clamp requires to be compressed and held closed around the hose and nipple, as shown in such figure, while a screw-bolt and nut are being applied. For this purpose, I employ the attachment shown in said figure, which is operated by the piston, B, and consists of two open or substantially semi-circular jaws, S and S', S', fixed, the other S, movable. The shank of the fixed jaws S', is screwed into a bracket, T, and held by a jam-nut. The other jaw, S, is similarly attached to a projection of the adjacent cross-head, D, or piston rod, C. The two jaws, S, S', are thus always in line with each other, their open sides being upward, to adapt them to conveniently receive the hose, x, and coupling, y, between them. The coupling with its open screw-clamp, R, attached, being held in due position between the said jaws S, S', and air or steam again admitted to the cylinder, A, the piston forces the jaw, S, forward until its projecting lower portion comes in close apposition with the other jaw, S', whereby the spring clamp, R, is compressed on the hose, and its flanged and apertured ends are approximated so that the fastening bolt and nut may be easily applied manually.

The hose x is not always of uniform diameter, and to adapt the jaws f, f, to clamp different sizes of hose, I provide a bushing which is made of two semi-cylindrical parts g, g, (Fig. 4.) Each part g has an exterior flange which fits in a corresponding groove in jaws f, it being secured to the latter by a screw. By such means the bushing g g, is prevented from longitudinal movement in the jaws f.

As a means for removing old hose from clutch nipples, I employ a fork, U, (Figs. 1 and 7,) which is fixed to the base between the arms E, E. The coupling is placed in the fork, E, and the hose extended through the clamp, F, and socket, G. Then steam being admitted to the cylinder, A, the clamp will seize the hose and apply tractive force thereto, thus drawing it off the nipple of the clutch.

What I claim is—

1. In an apparatus for applying hose to couplings, the combination of the reciprocating hose-clamp, composed of tapered jaws, fixed on yielding arms, whereby they are adapted to move toward or from each other laterally, a tapered socket adapted to receive such jaws and close them upon a hose, and means for forcing the clamp forward into said socket, substantially as shown and described.

2. In an apparatus for the purpose specified, the combination of a reciprocating compressible hose clamp, means for compressing such clamp upon a hose which are adapted to yield in the direction of forward movement of the clamp, means for forcing the clamp forward, and a device for supporting or holding the nipple, or other hose coupling, substantially as shown and described.

3. In an apparatus for the purpose specified, the combination of a reciprocating hose clamp proper, formed of two tapered parts, a yielding conical socket adapted to receive such clamp and close it upon the hose section, and a device for supporting or holding the nipple, or other form of coupling, substantially as shown and described.

4. In an apparatus for the purpose specified, the combination of a reciprocating hose clamp proper, formed of two separable, tapered parts, or jaws, arranged opposite each other, and grooved or channeled lengthwise, interiorly, to receive a hose between them, a socket for receiving such clamp, the same being conical, corresponding to the clamp, and provided with a slot or opening for insertion and removal of the hose, means for reciprocating the clamp proper, and a device for supporting or holding the hose nipple, or other form of coupling, substantially as shown and described.

5. In an apparatus for the purpose specified, the combination of a sliding cross-head, bars, or arms, attached thereto and adapted to move laterally at their outer ends, hollow cone segments carried by the said outer ends of the bars and forming the clamp proper, a second cross-head having a conical socket open on one side, and axially aligned with the conical clamp, a slidable guide or carrier for such socket cross-head, and a spring arranged to support such guide or carrier and a device for supporting or holding the hose nipple or other form of coupling, substantially as shown and described.

6. The improved apparatus for the purpose specified, comprising the air cylinder, a piston slidable therein, a cross-head affixed to the piston rod, bars or arms pivotally connected with the cross-head, and hollow conical segments, serving as hose-clamping jaws, carried by said bars, a yielding cross-head having a conical socket for receiving and closing the said jaws, rods rigidly attached to such cross-head, guides for said rods, springs acting on the rods, cylindrical holders for the springs, and a device for supporting or holding the nipple or other form of hose coupling, substantially as shown and described.

7. In an apparatus for the purpose specified, the combination of the hose-clamping, tapered jaws, bars or arms carrying the same, a sliding cross-head to which said bars are attached, a spring interposed between the free ends of said bars, a cross-head having a conical socket for receiving the jaws and forcing them toward each other, and spring supports for such socket cross-head, as shown and described.

PETER WHYTE.

Witnesses:
HERVEY H. L. LLOYD,
WINDSOR A. SPINKS.